UNITED STATES PATENT OFFICE.

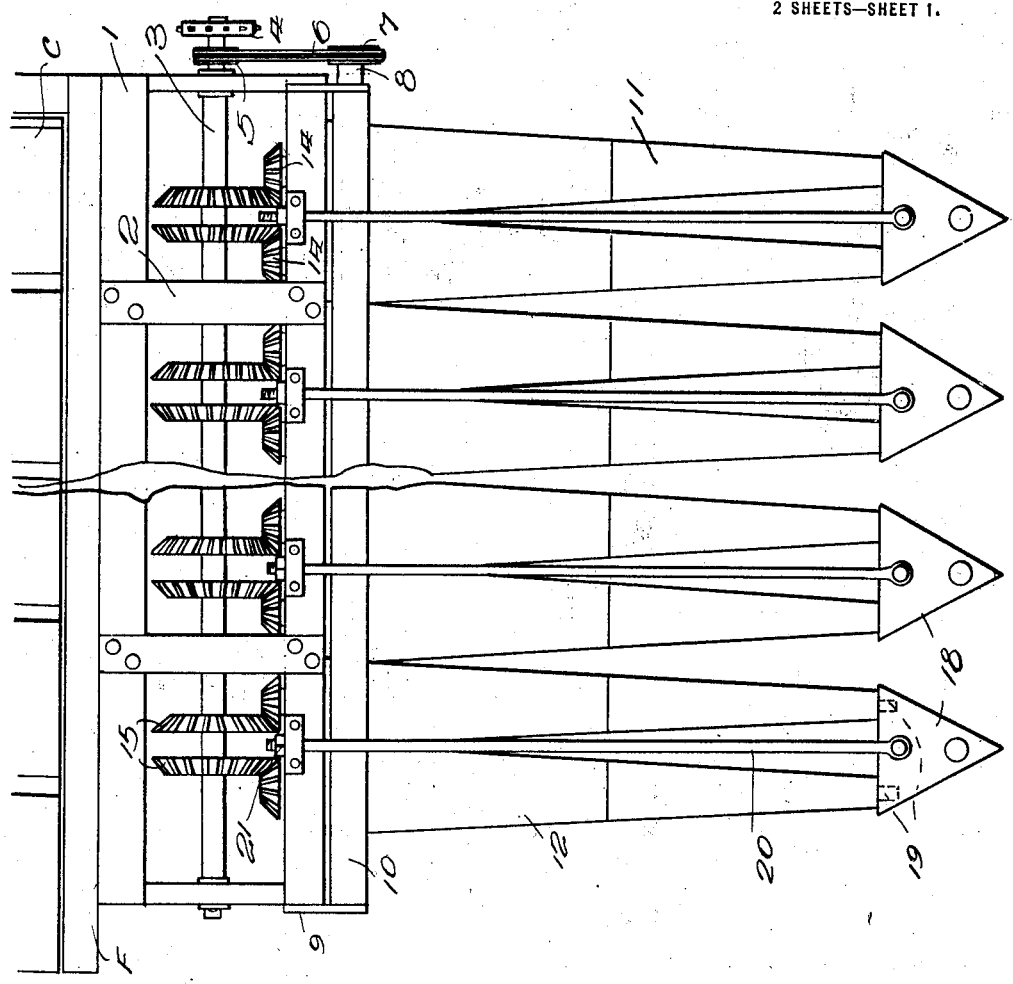

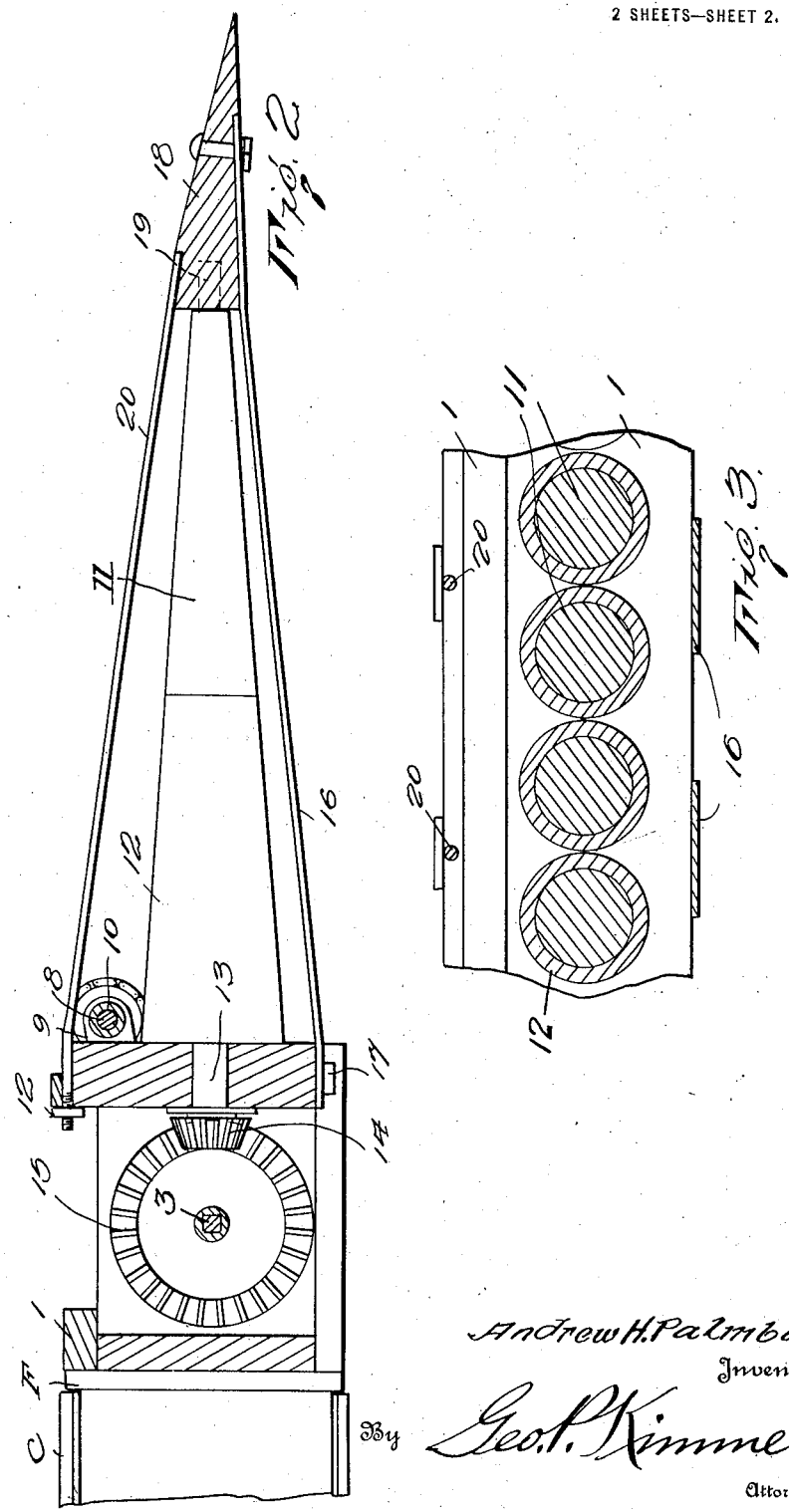

ANDREW H. PALMBUSH, OF CONRAD, MONTANA.

FLAX-HARVESTING ATTACHMENT.

1,333,568.   Specification of Letters Patent.   Patented Mar. 9, 1920.

Application filed April 23, 1918. Serial No. 230,280.

*To all whom it may concern:*

Be it known that I, ANDREW H. PALMBUSH, a citizen of the United States, residing at Conrad, in the county of Teton and State of Montana, have invented certain new and useful Improvements in Flax-Harvesting Attachments, of which the following is a specification.

This invention relates to improvements in harvesting machines and it is the principal object of the invention to provide an attachment therefor for harvesting flax, whereby the flax will have its roots removed from the soil during the harvesting operation, thus obviating considerable waste and effecting a material saving upon part of a user.

Another and equally important object of the invention is to provide a harvesting machine attachment which can be engaged or applied to any standard type of mowing machine with but slight alteration thereto, hence, rendering the same interchangeable.

It is a more specific object of the invention to provide a harvesting machine employing rotatable pulling elements between which the flax to be harvested is passed.

In order that the invention and the manner of its application may be readily understood by those skilled in the art, I have in the accompanying illustrative drawings and in the detailed following description based thereon set forth a preferred embodiment of the invention.

In the drawings:

Figure 1 is a fragmentary top plan of the improved flax harvesting attachment,

Fig. 2 is a vertical longitudinal section therethrough, and

Fig. 3 is a vertical transverse section through a portion of the same.

Having more particular reference to the drawings, in connection with which like reference characters will designate corresponding parts throughout the several views, F represents the frame of the standard type of mowing machine, the sickle bar and guards thereof being removed and $c$ represents the usual form of endless conveyer movable thereacross and having its opposite ends supported on suitable rollers or pulleys.

The improved flax harvesting attachment includes a frame indicated in its entirety by the numeral 1 comprising longitudinally disposed bars which as will be noted, have their opposite ends connected by transversely disposed elements and their intermediate portions braced by other transversely disposed arms generally indicated by the numeral 2. The rear portion of the frame 1 is bolted or otherwise secured to the adjacent portion of the mowing machine frame F and in this way, obviously, will be carried therewith during the movement of the mowing machine over a field.

Extending longitudinally of the frame 1 and supported in suitable bearings arranged in the opposite ends thereof is a driven shaft 3 carrying a sprocket wheel 4 on its outer end, which sprocket wheel receives a suitable chain thereabout having connection with the "bull" wheel or drive of the mowing machine. A second sprocket wheel 5 is also mounted on the driven shaft 3 adjacent the wheel 4 and receives a chain 6 thereabout, said chain extending forwardly into engagement with a sprocket wheel 7 carried upon one end of a countershaft 8 supported in bearings arranged upon the forward portion of the frame 1 as at 9 and arranged in a tubular casing 10.

A plurality of tapered rollers 11 are provided and are formed with trunnions and are rotatably mounted upon the forward portion of the frame 1 in juxtaposed relation, portions of said rollers being coated with rubber 12 or a similar composition whereby the flax passing between the same will be effectually gripped thereby. The trunnions at the inner or rear ends of the rollers constitute stub-shafts 13 and carry beveled gears 14 upon their inner extremities, which gears mesh with other beveled gears 15 fixedly mounted at intervals upon the driven shaft 3.

Runners 16 are provided and have certain of their ends secured by bolts 17 to the under side of the forward portion of the frame 1 while the forward or outer ends thereof are engaged with pointed deflecting elements 18 provided in turn with sockets in which are journaled the forward trunnions of the adjacent rollers as shown at 19. Truss rods 20 are connected to the upper sides of the various deflectors 18 and extend rearwardly into engagement with the front portion of the frame 1 whereat they are provided with locking nuts 21 to prevent the displacement of the same. In this way, it will be readily understood that the rollers 11 will be afforded a substantial rigid support and as a consequence will be prevented from moving unduly with relation to the surface of the field over which they are passing.

In operation, the mowing machine to which the attachment is applied is of course moved over a field having the flax planted therein; the tapered rollers 11 directing the flax therebetween and pulling the same when it is engaged with the coated portions 12 thereof, whereupon the same is then directed onto the endless conveyer belt $c$ by means of the ordinary form of feeder, not shown.

From the foregoing, it is to be noted that the flax harvested with my improved attachment will be pulled from the soil with the roots thereof intact, thus, effecting a material saving upon part of a user.

Manifestly, the construction shown is capable of considerable modification and such modification as is within the scope of my claim, I consider within the spirit of my invention.

I claim:

A flax harvesting attachment including an attaching and supporting frame, a main shaft rotatably mounted therein, a plurality of pairs of tapered coacting stripping rollers, trunnions at the forward and rear ends of the rollers, the rear trunnions constituting stub-shafts and being journaled in the forward bar of the frame, intermeshing gears carried by the main shaft and the stub-shafts for insuring of the rotation of the adjacent coacting rollers toward each other, a plurality of pointed deflectors having a pair of sockets in their rear edges for rotatably receiving the forward trunnions of the adjacent and coacting pairs of rollers, runners secured at the forward ends to the deflectors and at their rear ends to the frame, and truss rods having their forward ends connected to the deflectors and their rear ends secured to the frame.

In testimony whereof I affix my signature hereto.

ANDREW H. PALMBUSH.